US007692586B2

(12) United States Patent
Straatveit

(10) Patent No.: US 7,692,586 B2
(45) Date of Patent: Apr. 6, 2010

(54) SPARSE INTERFEROMETRIC ARRAY FOR RADIO FREQUENCY AZIMUTH DIRECTION FINDING

(75) Inventor: Sverre Nils Straatveit, White Plains, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 15 days.

(21) Appl. No.: 12/189,263

(22) Filed: Aug. 11, 2008

(65) Prior Publication Data

US 2010/0033377 A1    Feb. 11, 2010

(51) Int. Cl.
    *G01S 5/02*    (2010.01)
(52) U.S. Cl. .................. 342/424; 342/442; 342/445
(58) Field of Classification Search .............. 342/156, 342/424, 442, 445, 446
    See application file for complete search history.

(56) References Cited

U.S. PATENT DOCUMENTS

| 5,574,468 | A | * | 11/1996 | Rose | 342/442 |
| 5,936,575 | A | * | 8/1999 | Azzarelli et al. | 342/362 |
| 6,914,559 | B2 | * | 7/2005 | Marks | 342/428 |
| 7,330,840 | B2 | | 2/2008 | Straatveit | |
| 2007/0222667 | A1 | * | 9/2007 | Burlet et al. | 342/120 |

OTHER PUBLICATIONS

Austeng, A. et al., "1D and 2D Algorithmically Optimized Sparse Arrays," 1997 IEEE Ultrasonics Symposium 1683 1686.
Hoctor, R.T. et al., "Array Redundancy for Active Line Arrays," IEEE Transactions on Image Processing, vol. 5, No. 7, pp. 1179-1183 (Jul. 1996).
Manikas, A. et al., "Manifold Studies of Nonlinear Antenna Array Geometries," IEEE Transactions on Signal Processing, vol. 49, No. 2, pp. 497-506 (Mar. 2001).

* cited by examiner

*Primary Examiner*—Dao L Phan
(74) *Attorney, Agent, or Firm*—John J. Karasek; Joslyn K Barritt

(57) ABSTRACT

A sparsely populated array of antenna elements on a plane is provided such that the angle of arrival (AoA) measurement for a radiofrequency signal received by the array has high resolution and is non-ambiguous within a 360-degree azimuthal field of view. The array comprises a two-dimensional antenna array developed using fuzzy genetic logic based on specified criteria. In response to one specified set of criteria, the array comprises having a first large element formation combined with a second smaller element formation. The first large element formation supports high DF accuracy while the second smaller cluster facilitates ambiguity resolution.

14 Claims, 6 Drawing Sheets

Top View of 2-D DASI Interferometer Antenna Placement

Pair-Wise Element Phase Comparison (PEP)

Ambiguities for PEP with $d = \dfrac{\lambda}{2}$

Ambiguities for PEP with $d = \lambda$

SPARSE INTERFEROMETRIC ARRAY FOR RADIO FREQUENCY AZIMUTH DIRECTION FINDING

TECHNICAL FIELD

The present invention relates to design of a precision radio-frequency emitter direction-finding interferometric array of antenna elements.

BACKGROUND

Sensors of all types are increasingly important aspects of life in both the military and civilian worlds. Antennas, either singularly or in arrays, comprise one type of sensor. Radio-frequency transmissions received by these antenna arrays can be of significant importance, and in many cases it can be crucial to determine the direction from which the transmissions originate. The military, particularly the Navy, needs cost-effective precision radio-frequency emitter direction-finding systems for applications including enhanced situational awareness, radar system cueing, radar to electronic sensors tracking correlation. Such capability also can be important in the civilian realm, where it can be useful in locating the direction from which received radio-frequency transmissions originate can aid in determining location information for cell phone calls to 911 emergency numbers, determining gunshot locations, or resolving ambiguities for commercial sonar arrays.

In general, direction-finding (DF) techniques can be classified as either amplitude comparison or phase comparison technologies. Amplitude comparison DF technologies are moderately priced, but provide only relatively low DF accuracy. Phase comparison technologies can provide better DF accuracy, but involve certain ambiguities that can make them prohibitively expensive.

For example, one phase comparison technique uses a linear interferometer comprising two or more antenna elements at a distance d apart. Using such an array to determine an angle of arrival (AoA) of a received radio-frequency wave involves measuring a difference between a phase of the wave received at one element and a phase of the wave received at another element. However, such phase comparison techniques also involve ambiguities in determining a direction of an incoming signal because more than one incoming angle can often result in the same measured phase difference.

Interferometer DF accuracy is a function of aperture size, with a larger array providing better performance. A conventional high-performance linear interferometer array typically has four to six antenna channels and provides a field of view of greater than 90 degrees, and so in order to provide a full 360-degree field of view, four such arrays would be needed. However, as the array gets larger, additional phase ambiguities are introduced. In order to control the ambiguity, more antenna/receiver channels are typically added, but such additional channels can make the array too large, heavy, and costly to be a fully viable system, particularly for use on board a ship or in the growing unmanned aerial vehicle (UAV) field.

To address this problem, alternate interferometer designs are being sought. The history of antenna array geometry design has been formulated as an optimization problem, for example, a problem involving relatively prime integer optimization. Radio astronomers looking for an optimal design have used interferometry principles and have studied array redundancy. See e.g., "Hoctor, R. T. et al., "Array Redundancy for Active Line Arrays," IEEE Transactions on Image Processing, Vol. 5, No. 7, pp. 1179-1183 (July 1996). More recently, sensitivity analysis of the array manifold and its differential geometry have been explored for use as criteria for array geometry evaluation. See Manikas, A. et al., "Manifold Studies of Nonlinear Antenna Array Geometries," IEEE Transactions on Signal Processing, Vol. 49, No. 2, pp. 497-506 (March 2001).

Sparse linear interferometers comprise one alternative interferometer design. Sparse linear interferometers are based on non-periodic antenna element placement and are set to provide maximum phase ambiguity resolution with a minimum number of channels. Due to the nature of the design of a sparse interferometer, although doubling the DF accuracy requires a doubling of the length of the array, it does not require a doubling of the number of channels, and therefore sparse linear interferometers scale very efficiently. See, e.g., Austeng, A. et al., "1D and 2D Algorithmically Optimized Sparse Arrays," 1997 IEEE Ultrasonics Symposium 1683-1686.

These and other efforts at antenna array design are described in U.S. Pat. No. 7,330,840, "Method and Apparatus for Genetic Fuzzy Design," issued to Sverre Nils Straatveit, one of the inventors of the present invention, the entire disclosure of which is hereby incorporated by reference herein. Other antenna array design considerations and approaches to addressing those considerations are described in the U.S. patent application entitled "Histogram for Ambiguity Visualization and Evaluation (HAVE)," Navy Case No. 98857-US 1, by Sverre Nils Straatveit and Peter W. Schuck, which was filed concurrently with the present application and the entire disclosure of which is incorporated herein by reference.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter.

The present invention provides a sparsely populated array of antenna elements on a plane such that the angle of arrival (AoA) measurement has high resolution and is non-ambiguous within a 360-degree azimuthal field of view. The array comprises a two-dimensional antenna array having a first large element formation combined with a second smaller element formation. The array of elements according to the present invention was determined by the Genetic Fuzzy algorithm described in U.S. Pat. No. 7,330,840 referenced above to be an advantageous design for a sparse interferometric array because the first large element formation can support high DF accuracy while the second smaller cluster can facilitate resolution of ambiguities in the estimated direction of the received signal.

DETAILED DESCRIPTION

The aspects summarized above can be embodied in various forms. The following description shows, by way of illustration, combinations and configurations in which the aspects can be practiced. It is understood that the described aspects and/or embodiments are merely examples. It is also understood that one skilled in the art may utilize other aspects and/or embodiments or make structural and functional modifications without departing from the scope of the present disclosure. For example, although the array described herein is often described as receiving radiofrequency signals, it will be apparent to one skilled in the art that an array in accordance with the present invention can be used for reception of electromagnetic signals in other frequency ranges, such as signals in the optical range.

Figure 1A:
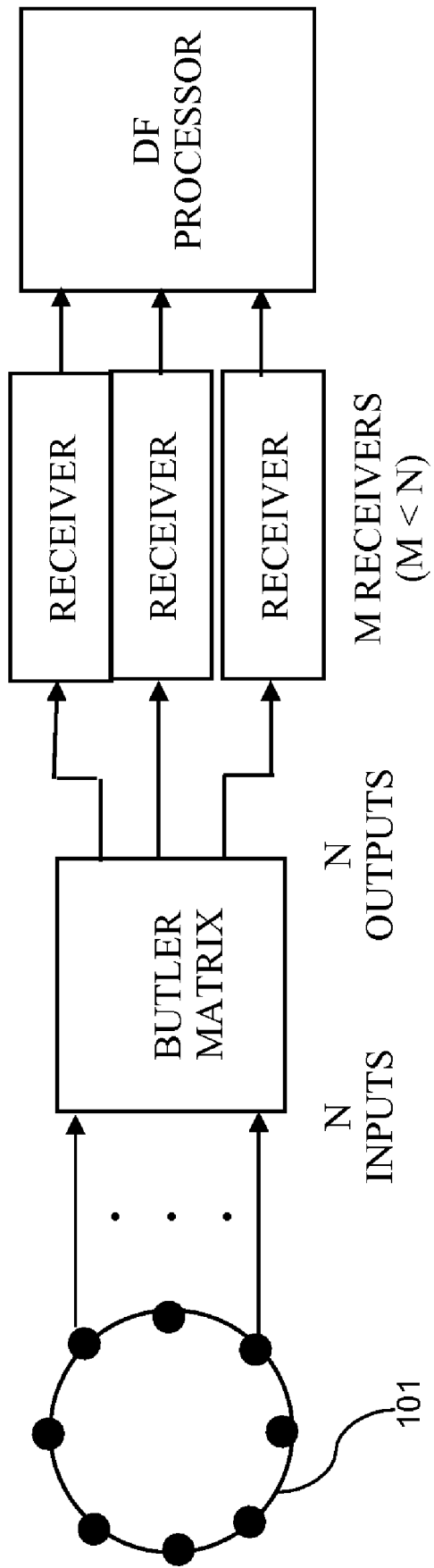
FIG. 1A is a block diagram showing a conventional circular array of antenna elements.
Figure 1B:
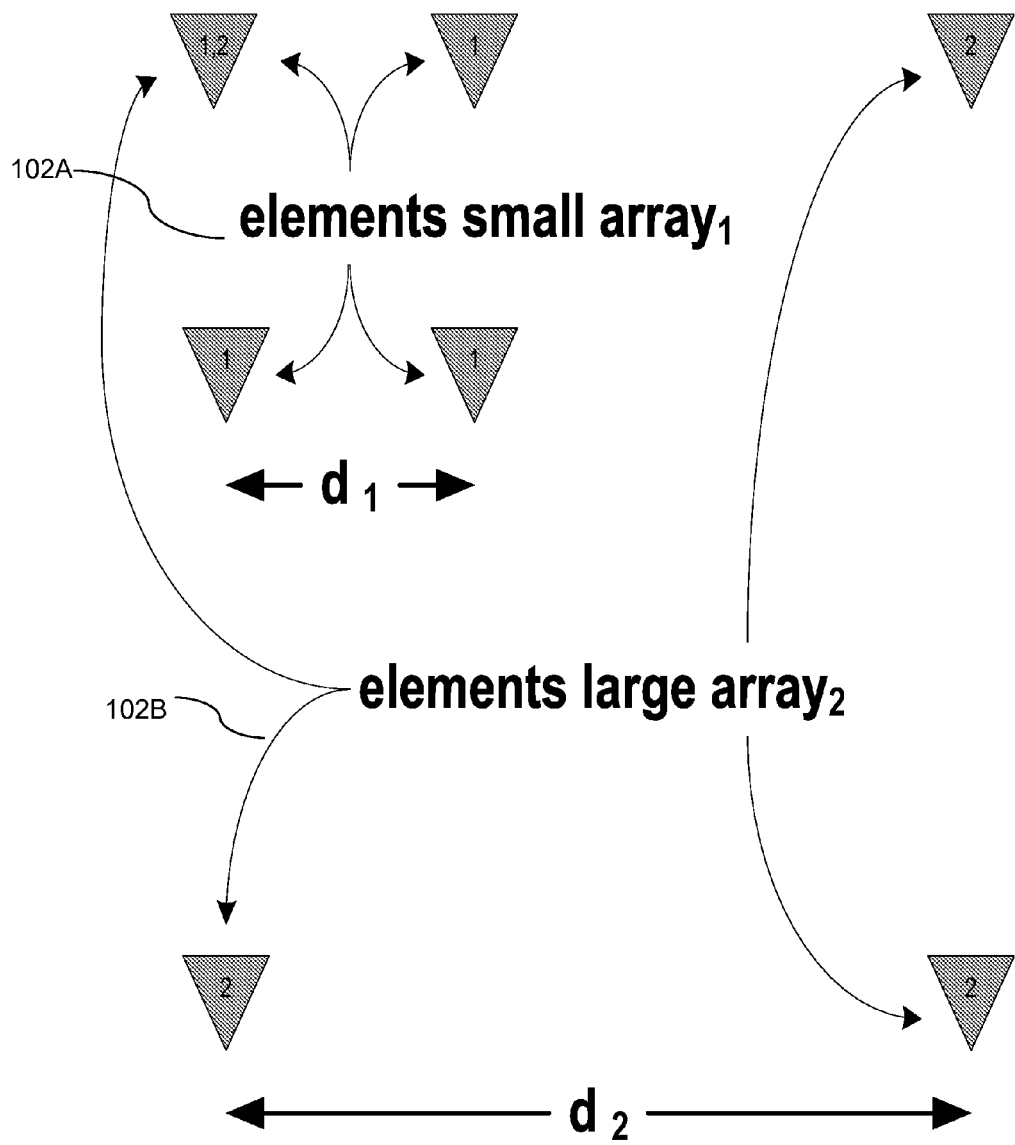
FIG. 1B is a block diagram showing a conventional sparse array of antenna elements.

As noted above, many antenna arrays have been designed in an attempt to provide wide coverage and to provide disambiguation of the estimated angle of arrival of the received signal. One prior array designs include a conventional circular array of elements, such as is shown in FIG. 1A, wherein a number of elements are equidistantly placed in a circular configuration 101 to provide 360-degree coverage. However, such a configuration requires a relatively large number of elements to avoid grating lobes and may not be suitable for use in a small space such as a UAV. Another prior design includes a large array and a smaller array, shown in FIG. 1B, in which elements in the small array 102A are equidistantly placed one-half wavelength apart $$\left(d_1 = \frac{\lambda}{2}\right),$$

while elements in the larger array 102B have much larger placement, i.e., $d_2 \gg d_1$). However, in the array shown in FIG. 1B, the spacing of elements is constrained to $$d_1 = \frac{\lambda}{2} \text{ and } d_2 \gg \frac{\lambda}{2}$$

if the angle of approach is to be disambiguated, which limits the flexibility of the array and its suitability for certain installations.

The present invention comprises an antenna array designed using genetic fuzzy logic, such as that described in U.S. Pat. No. 7,330,840 referenced above, and provides an improvement over these prior arrays. The antenna array of the present invention is output from a genetic fuzzy logic algorithm in accordance with criteria input into the algorithm, to produce an array that satisfies the criteria.

One embodiment of an antenna array according to the present invention, called the "2-D Direction-of-Arrival Sparse Interferometer" (2-D DASI), was developed utilizing the Genetic Fuzzy optimization algorithm described in the '840 patent. The Genetic Fuzzy algorithm was used to search an N-dimensional design space, where N is the number of possible array element positions, to optimize the disparate and often conflicting criteria affecting design of an interferometer array. These criteria included a number of elements in the array, number of duplicated angle of arrival (AoA) measurements estimated by the array, extent of spatial resolution of the array, extent of redundancy in the array, spacing of elements in the array, and ability of the array to produce unique traces after phase unwrapping. In addition, it was desirable that the designed array have few elements to minimize the cost, size, and weight of the array, have a minimum number of duplicate AoA measurements, and have large element spacing to avoid mutual coupling and physical element interference.

Figure 2:
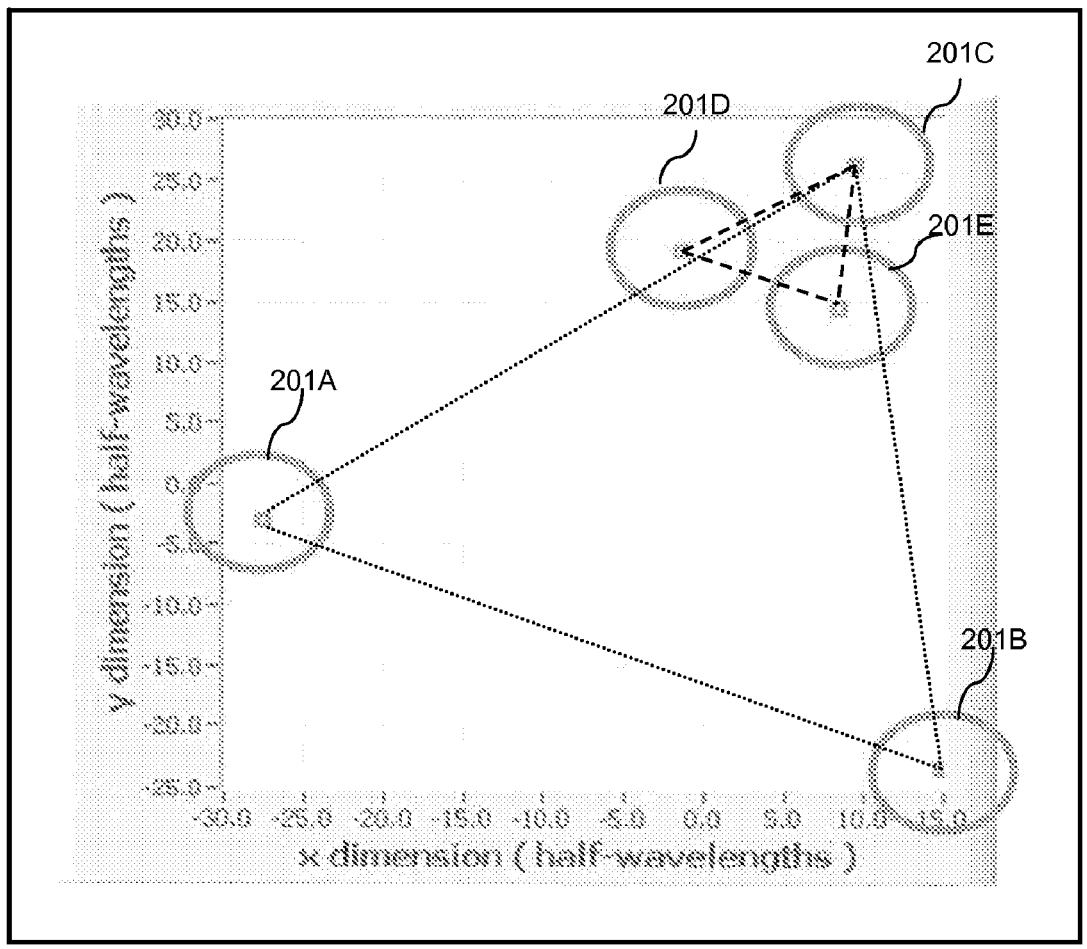
FIG. 2 is a block diagram depicting an exemplary placement of antenna elements in a two-dimensional sparse interferometer array according to the present invention.

FIG. 2 depicts an exemplary configuration of antenna elements in a 2-D Direction-of-Arrival Sparse Interferometer (2-D DASI) according to the present invention. The exemplary configuration of elements in the 2-D DASI shown in FIG. 2 was developed using the Genetic Fuzzy optimization algorithm based on the specific set of criteria described above, such as minimizing the number of elements while maximizing AoA disambiguation. It should be noted that use of other criteria as inputs to the Genetic Fuzzy algorithm may result in a different element configuration having a different geometry, and such different element configurations also are within the scope of the present disclosure. For example, as discussed below, in the exemplary array configuration shown in FIG. 2 the elements are arranged in two triangular formations; however, it is possible that array configurations having other polygon shapes may be output from a genetic fuzzy algorithm using other design criteria, and further possible that the array comprise multiple formations each having a different polygon shape if such a configuration is determined by the genetic fuzzy algorithm to best meet the input design criteria.

The exemplary array shown in FIG. 2 includes one large triangular element formation ABC comprising elements 201A, 201B, and 201C and a smaller triangular cluster CDE of elements 201C, 201D, and 201E in the upper right corner. The large triangular element formation ABC in this configuration supports high DF accuracy by providing widely spaced elements, while the smaller cluster CDE facilitates ambiguity resolution, and consequently, the 2D-DASI configuration shown in FIG. 2 satisfies the design requirements of high DF accuracy with low ambiguity of the result.

In the exemplary array shown in FIG. 2, neither triangle ABC nor triangle CDE in the 2D-DASI array are regular in any fashion. This irregularity of the triangular element arrangements is one of the characteristics of the 2D-DASI array as designed by the Genetic Fuzzy algorithm in response to the input criteria, and contributes to the lack of ambiguities in the AoA θ detected by the array. In fact, when a test array having two equilateral triangles of the same relative sizes as those in the array of the present invention was input into the genetic population for the Genetic Fuzzy algorithm, such an array failed to provide a unique one-to-one mapping between the AoA and the trace in the array manifold, i.e., failed to satisfy the disambiguation criterion input into the Genetic Fuzzy algorithm.

As can be seen from the x- and y-axis scales in FIG. 2, the elements in the 2D-DASI array can be placed much farther apart than in the prior art arrays. In the exemplary array configuration shown, the closest placement of elements in the smaller cluster is more than five half-wavelengths apart, with the elements in the larger cluster being placed approximately 50 half-wavelengths apart. The relatively large distance between elements aids in avoiding mutual coupling between elements. In addition, as discussed below, the relatively large placement between even the closest elements allows the array to provide significant DF accuracy, while the combination of a large element formation with a smaller element cluster enables the array to resolve AoA ambiguities to provide more accurate determination of the AoA of an incoming RF signal.

In addition, no three of the five elements in the exemplary 2D-DASI array shown in FIG. 2 are in a straight line, but instead comprise 10 pairs of two elements each. As discussed below, each pair of elements receives the incoming RF signal at a particular AoA θ with each element receiving the signal at a particular phase, and each pair of elements thus forms a two-element interferometer. This difference in phase of the received signal for a pair of elements is known as a "pair-wise element phase comparator" or "PEP." Because no more than two elements shown in FIG. 2 are in a straight line, the five elements form ten unique pairs and thus there are ten unique PEPs in the array. As described below, the existence of these multiple PEPs in the array can be used to accurately estimate the AoA θ of the incoming radio-frequency wave.

Figure 3:
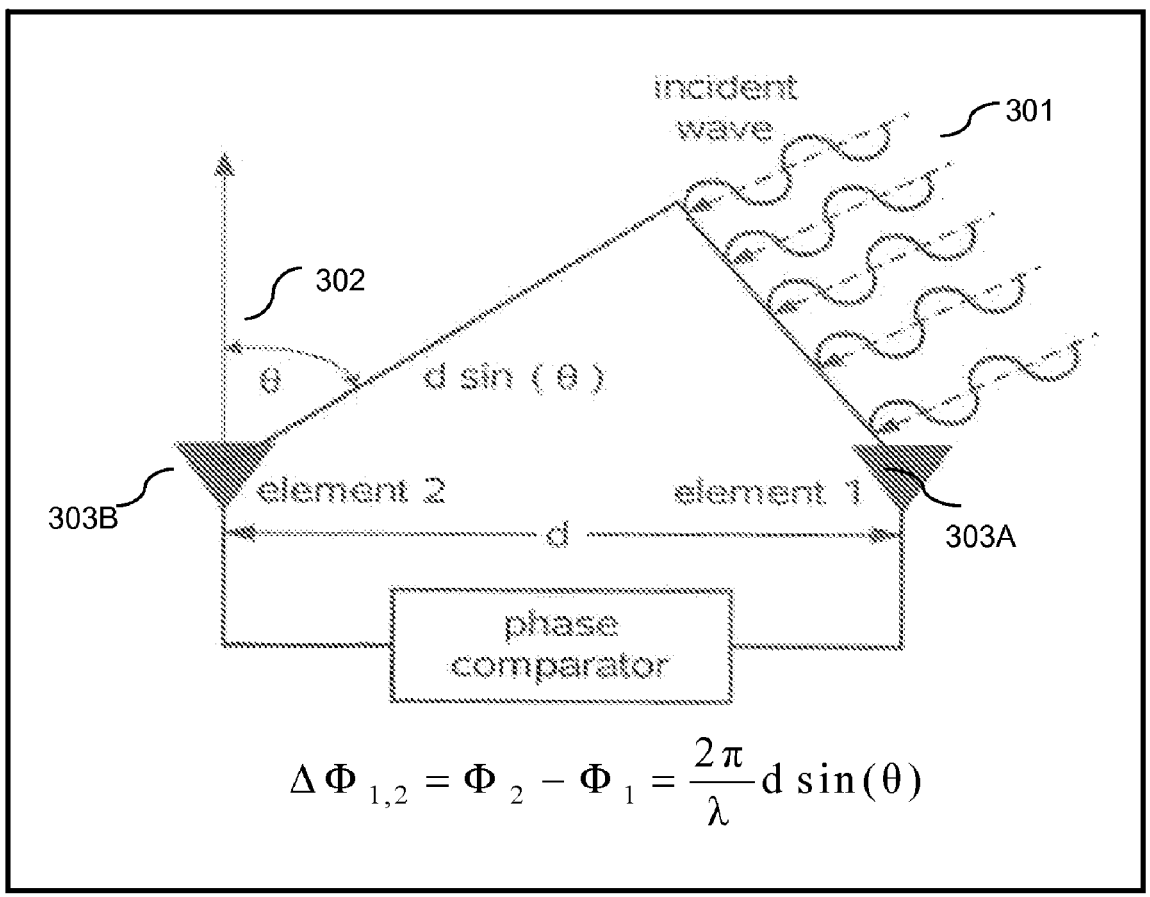
FIG. 3 is a block diagram depicting an exemplary interferometer comprising a Pair-Wise Element Phase Difference (PEP) in an antenna array according to the present invention.

A schematic of an exemplary PEP is shown in FIG. 3. As shown in FIG. 3, an incoming RF signal 301 is received by a pair of antenna elements 303A and 303B situated at a distance d apart. The incoming signal approaches the pair of elements at an AoA θ 302 which in the schematic shown in FIG. 3 is measured from the vertical. The difference $\Delta\Phi_{1,2}$ in the signal phase received by element 1 and element 2 is given by the equation:

$$\Delta\Phi_{1,2} = \Phi_2 - \Phi_1 = \frac{2\pi}{\lambda} d \sin(\theta)$$

where $\Phi_1$ and $\Phi_2$ are the phases in radians of the received RF signal at elements 1 and 2, respectively, and d is the distance between them. The phase of the received signal can be determined when it is received, and thus the AoA θ at a pair of elements can be estimated by the PEP by solving the equation for θ.

Figure 4A:
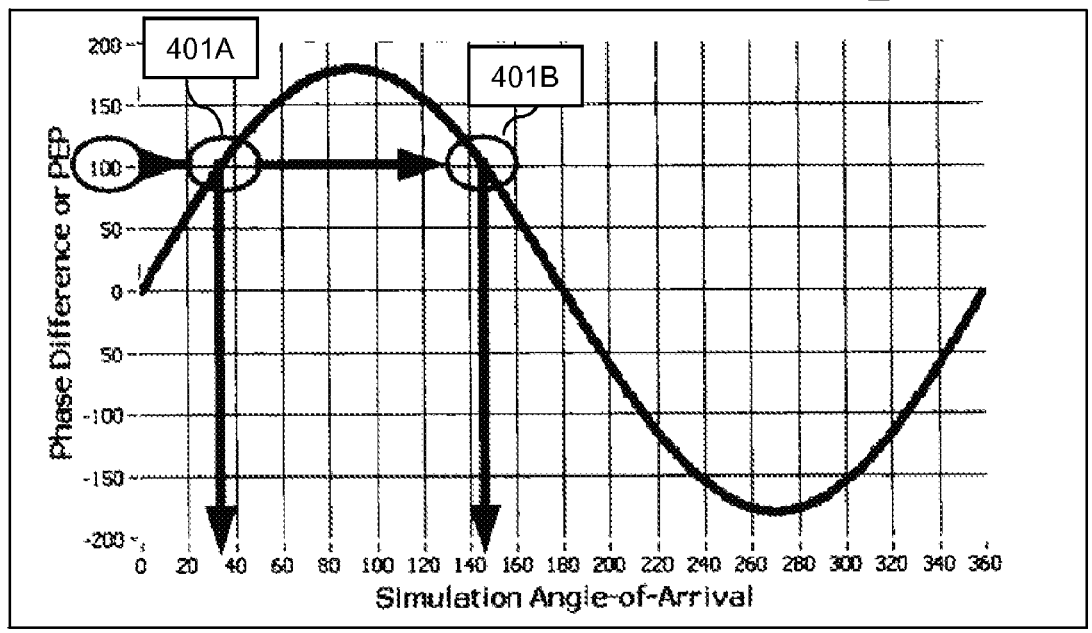
FIG. 4A is a plot depicting the existence of ambiguities for PEP measurements between 0 and 180 degrees for two elements one-half wavelength apart in a conventional interferometric array.
Figure 4B:
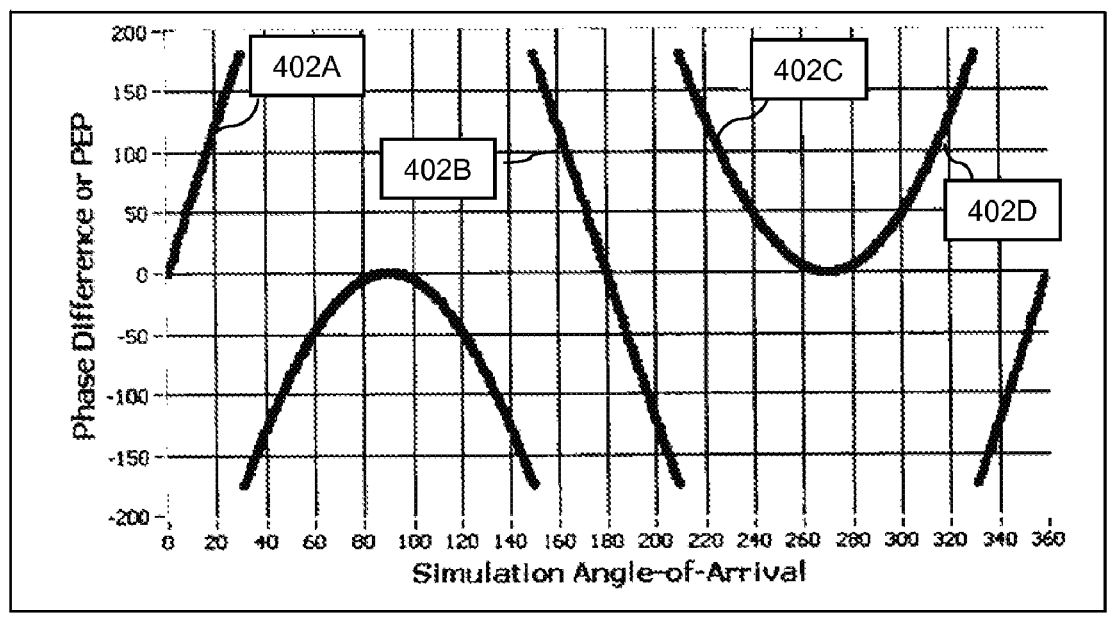
FIG. 4B is a plot depicting the existence of additional ambiguities for PEP measurements for array elements one wavelength apart in a conventional interferometric array.

However, as shown in FIGS. 4A and 4B, the AoA estimated by the PEP for any one pair of elements 1 and 2 is ambiguous. In other words, there are at least two different angles θ that can produce the same phase difference $\Delta\Phi_{1,2}$. Thus, as shown in FIG. 2A, for two elements placed one-half wavelength apart $$\left(d = \frac{\lambda}{2}\right),$$

there is one "mirror reflection" ambiguity for each phase difference $\Delta\Phi$. For example, at $\Delta\Phi=100$ degrees, the angle of arrival θ can equal either 34 degrees (401A) or 146 degrees (401B); the PEP cannot distinguish between those two values. This ambiguity, which can be referred to as a "mirror" ambiguity, can be fairly easily resolved because only two possible angles need to be examined. For an array of only two elements (i.e., for any one PEP), the array is ambiguous over an entire 180-degree range. In addition, the number of ambiguities increases as the distance between elements increases. Thus, as shown in FIG. 3B, for a PEP comprising two elements one wavelength apart, i.e., d=λ, the number of possible angles of approach increases to four, so that at $\Delta\Phi=100$, the AoA θ can equal any one of 16 (402A), 164 (402B), 227 (402C), or 314 (402D) degrees without the PEP being able to distinguish among them. Although a small ambiguity, for example, less than 5 degrees, in the angle of approach may be acceptable, an ambiguity of 16 versus 224 degrees—almost opposite directions—is very likely not to be acceptable because of the great difference in approach directions. Thus, design of an interferometer array must reconcile the desire for increased array size to improve accuracy with the need for resolution of the resulting ambiguities and more precise determination of the angle of arrival.

Thus, as although as described above, array size is one factor that affects DF accuracy, with a larger spacing between elements providing greater accuracy, larger spacing between elements in an interferometer also can increase the ambiguity in AoA θ detected by any pair of elements, i.e., the number of different angles that can be detected by the same PEP.

In accordance with the present invention, however, the 2D-DASI array configuration was designed by the Genetic Fuzzy method of the '840 patent to minimize ambiguity in angle of approach and has an appropriate number and placement of elements, and thus an appropriate number of PEPs, to resolve these ambiguities and determine the AoA θ of an incoming signal with high accuracy.

Figure 5:
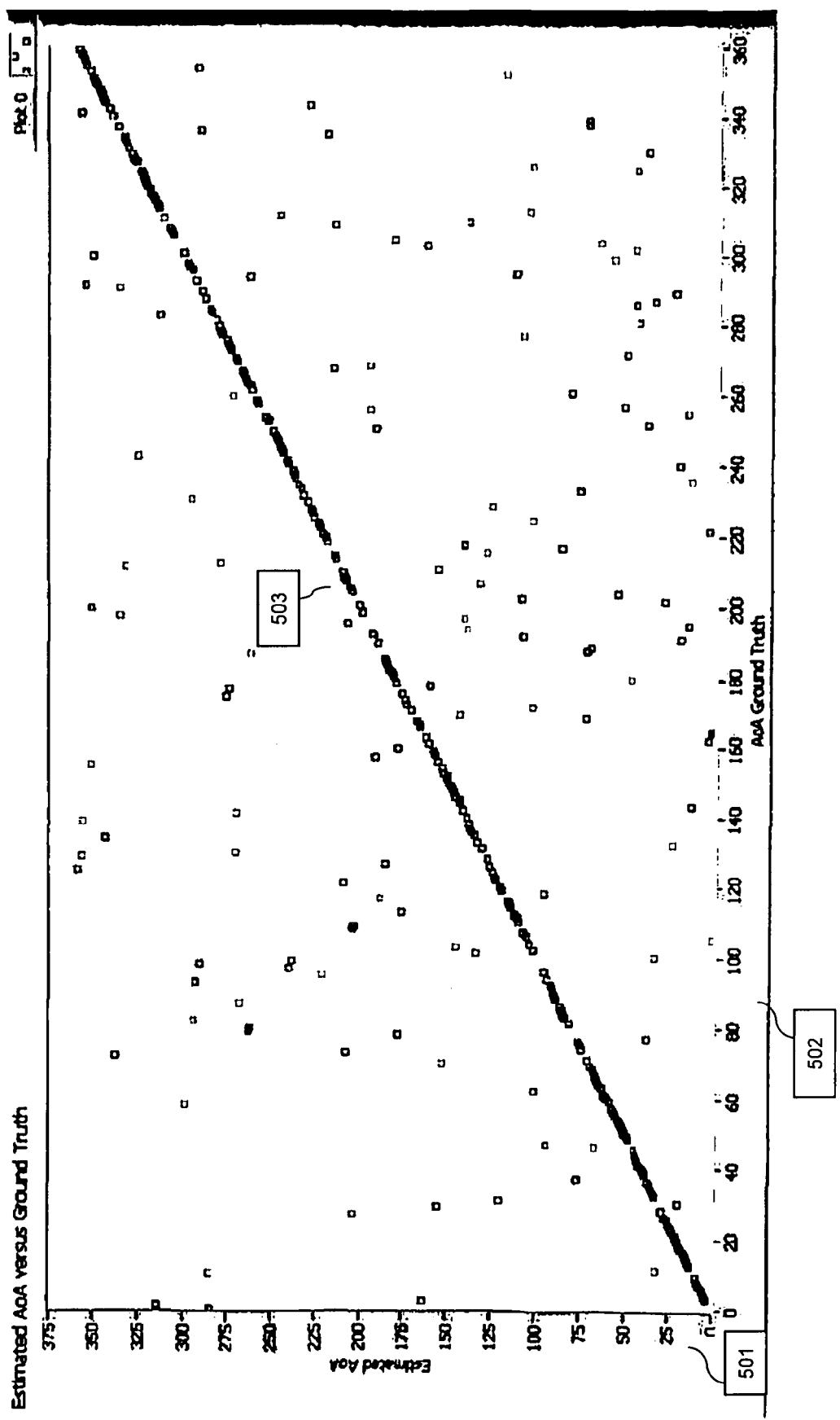
FIG. 5 depicts an exemplary plot of measured Angle-of-Approach data against Angle-of-Approach values calculated using an Angle-of-Approach decoding method according to the present invention.

FIG. 5 shows a plot of actual AoA for signals impinging the array in test cases versus the estimated AoA determined by the 2D-DASI array of the present invention. A perfect result would be a single diagonal line, and the plot 503 shows how consistently the estimated AoA, shown on the vertical axis 501, tracks the actual, physical angles of approach, shown on the horizontal axis 502. The points outside the diagonal line are minimal, and are likely caused by noise factors such as mechanical switch bounce in data collection hardware or discontinuity points in the angle of approach measurement software. It is expected that such spurious responses and outlying points will be reduced as improvements in these areas are made.

Thus, a major advantage of the 2D-DASI interferometric array in accordance with the present invention is a dramatic reduction in DF system cost for 360-degree azimuth coverage due to the much smaller number of elements needed to receive signals and resolve ambiguities around a full 360-degree field of view. In addition, the 2D-DASI array is scalable to enable the provision of a larger array with elements placed at higher wavelength multiples apart, which can improve the DF resolution of the array and make the array less susceptible to noise caused by close placement of elements in the array.

Although particular embodiments, aspects, and features have been described and illustrated, it should be noted that the invention described herein is not limited to only those embodiments, aspects, and features. It should be readily appreciated that modifications may be made by persons skilled in the art, and the present application contemplates any and all modifications within the spirit and scope of the underlying invention described and claimed herein. Such embodiments are also contemplated to be within the scope and spirit of the present disclosure. For example, an array of antenna elements can be developed using the HAVE histogram of Navy Case No. 98857-US1 described above in combination with other criteria and Genetic Fuzzy logic, and such an array is contemplated as being within the scope of the present invention.

What is claimed is:

1. A two-dimensional sparse interferometric array for determining an angle of approach of an incoming signal incident to the array, comprising:
a first plurality of elements in a first sub-array and a second plurality of elements in a second sub-array, the first sub-array having a size different from a size of the second sub-array and no three of the first and second pluralities of elements being co-linear, the first and second pluralities of elements forming a plurality of pairs of elements, a configuration of the first and second sub-arrays satisfying a genetic fUzzy optimization algorithm for antenna array design based on a specific set of criteria;
wherein the configuration of the first sub-array and the configuration of the second sub-array of elements minimizes a number of elements in the array and provides an unambiguous estimate of an angle of approach of the signal.

2. The two-dimensional sparse interferometric array according to claim 1, wherein the incoming signal is a radiofrequency signal.

3. The two dimensional sparse interferometric array according to claim 1, wherein the incoming signal is an optical signal.

4. The two-dimensional sparse interferometric array according to claim 1, wherein the incoming signal is received by a first element in a pair of elements at a first phase and is received by a second element in a pair of elements at a second phase, a difference between the first phase and the second phase comprising a corresponding pair-wise element phase difference for the pair of elements, an angle of approach of the incoming signal to the pair of elements being determined by the pair-wise element phase difference, the angle of approach to the pair of elements so determined having an ambiguity; and
wherein the arrangement of elements in the first and second sub-arrays resolves the ambiguity to provide the unambiguous estimate of the angle of approach of the signal to the array.

5. The two-dimensional sparse interferometric array according to claim 1, wherein a distance between elements in at least one of the first and second sub-arrays in accordance with the genetic fuzzy optimization algorithm is at least five and one-half wavelengths.

6. The two-dimensional sparse interferometric array according to claim 1, wherein a configuration of the first sub-array and a configuration of the second sub-array in accordance with the genetic fuzzy optimization algorithm each comprises a polygon having the same number of sides.

7. The two-dimensional sparse interferometric array according to claim 6, wherein a configuration of the first sub-array and a configuration of the second sub-array in accordance with the genetic fuzzy optimization algorithm each comprises an irregular triangular array.

8. The two-dimensional sparse interferometric array according to claim 7, wherein the configuration of the first sub-array comprises a large triangle and the configuration of the second sub-array comprises a small triangle.

9. The two-dimensional sparse interferometric array according to claim 8, wherein the first triangular sub-array has a minimum characteristic scale of 30 wavelengths and the second triangular sub-array has a minimum characteristic scale of 5½ wavelengths.

10. The two-dimensional sparse interferometric array according to claim 1, wherein at least one of the first plurality of elements comprises one of the second plurality of elements such that the first arrangement of elements in accordance with the genetic fuzzy optimization algorithm and the second arrangement of elements in accordance with the genetic fuzzy optimization algorithm share a common element.

11. The two-dimensional sparse interferometric array according to claim 1, wherein the specific set of criteria includes a requirement of minimizing a number of elements while maximizing disambiguation of the angle of arrival.

12. A two-dimensional sparse interferometric array for determining an angle of approach of an incoming signal incident to the array, comprising:
a single array comprising a first plurality of elements in a first sub-array and a second plurality of elements in a second sub-array, the first sub-array having a size different from a size of the second sub-array and no three of the first and second pluralities of elements being co-linear, the first and second pluralities of elements forming a plurality of pairs of elements, a physical configuration of each of the first and second sub-arrays and a physical relationship between the first and second sub-arrays satisfying a genetic fUzzy optimization algorithm based on specific criteria designed to eliminate ambiguities in an angle of approach of the incoming signal;
wherein the configuration of elements in the first sub-array and the second sub-array minimizes a number of elements in the array and permits an unambiguous estimate of the angle of approach of the signal.

13. A two-dimensional sparse interferometric array for determining an angle of approach of an incoming signal incident to the array, comprising:
a single array comprising a first plurality of elements in a first sub-array and a second plurality of elements in a second sub-array, the first and second arrays each comprising at least three elements and the first sub-array having a size different from a size of the second sub-array and no three of the first and second pluralities of elements being co-linear, the first and second pluralities of elements forming a plurality of pairs of elements, a configuration of the first and second sub-arrays satisfying a genetic fuzzy optimization algorithm based on a specific set of criteria;
wherein the configuration of elements in the first sub-array and the second sub-array minimizes a number of elements in the array and permits an unambiguous estimate of the angle of approach of the signal.

14. A two-dimensional sparse interferometric array for determining an angle of approach of an incoming signal incident to the array, comprising:
a single array comprising a first plurality of elements in a first sub-array and a second plurality of elements in a second sub-array, the first sub-array having a size different from a size of the second sub-array and no three of the first and second pluralities of elements being co-linear, the first and second pluralities of elements forming a plurality of pairs of elements, a configuration of the array comprising output from a genetic fuzzy optimization algorithm for antenna array design in accordance with criteria input into the algorithm;
wherein the configuration of the first sub-array and the configuration of the second sub-array of elements minimizes a number of elements in the array and provides an unambiguous estimate of an angle of approach of the signal.

* * * * *